United States Patent
Lucovsky et al.

(10) Patent No.: US 9,942,277 B2
(45) Date of Patent: *Apr. 10, 2018

(54) POLICY ENGINE FOR CLOUD PLATFORM

(71) Applicant: Pivotal Software, Inc., San Francisco, CA (US)

(72) Inventors: Mark Lucovsky, Carpinteria, CA (US); Derek Collison, Atherton, CA (US); Vadim Spivak, Emerald Hilss, CA (US); Gerald C. Chen, San Francisco, CA (US); Ramnivas Laddad, Palo Alto, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,992

(22) Filed: Jan. 30, 2017

(65) Prior Publication Data

US 2017/0208096 A1 Jul. 20, 2017

Related U.S. Application Data

(63) Continuation of application No. 14/738,558, filed on Jun. 12, 2015, now Pat. No. 9,560,079, which is a
(Continued)

(51) Int. Cl.
*H04L 29/06* (2006.01)
(52) U.S. Cl.
CPC .......... *H04L 63/20* (2013.01); *H04L 63/0815* (2013.01)
(58) Field of Classification Search
USPC ......................................................... 726/7
See application file for complete search history.

(56) References Cited

U.S. PATENT DOCUMENTS 6,609,128 B1   8/2003  Underwood
6,976,093 B2  12/2005  Lara et al.
(Continued)

FOREIGN PATENT DOCUMENTS

EP   2 299 360      3/2011
EP   2 381 363     10/2011
JP   2007-507046    3/2007

OTHER PUBLICATIONS

White page of BMC software, "Virtualization management with BMC and VMware"© 2011 BMC software 2 pages.
(Continued)

*Primary Examiner* — Jason T Lee
(74) *Attorney, Agent, or Firm* — Fish & Richardson P.C.

(57) ABSTRACT

A policy engine is situated within the communications path of a cloud computing environment and a user of the cloud computing environment to comply with an organization's policies for deploying web applications in the cloud computing environment. The policy engine intercepts communications packets to the cloud computing environment from a user, such as a web application developer, for example, in preparation for deploying a web application in the cloud computing environment. The policy engine identifies commands corresponding to the communications packets and directs the communications packets to appropriate rules engines corresponding to such commands in order to execute rules to comply with an organization's policies. Upon completion of execution of the rules, the communications packets are forwarded to the cloud computing environment if they comply with the policies.

15 Claims, 6 Drawing Sheets

Related U.S. Application Data continuation of application No. 14/064,992, filed on Oct. 28, 2013, now Pat. No. 9,071,522, which is a continuation of application No. 13/094,500, filed on Apr. 26, 2011, now Pat. No. 8,572,706.

(60) Provisional application No. 61/327,898, filed on Apr. 26, 2010.

(56) References Cited

U.S. PATENT DOCUMENTS

| | | | |
|---|---|---|---|
| 7,275,244 | B1 | 9/2007 | Bell et al. |
| 7,356,679 | B1 | 4/2008 | Le et al. |
| 7,370,322 | B1 | 5/2008 | Malena et al. |
| 7,874,008 | B2 | 1/2011 | Chang et al. |
| 7,971,059 | B2 | 6/2011 | Calman et al. |
| 8,108,912 | B2 | 1/2012 | Ferris |
| 8,176,094 | B2 | 5/2012 | Friedman |
| 8,176,559 | B2 | 5/2012 | Mathur et al. |
| 8,201,237 | B1 | 6/2012 | Doane et al. |
| 8,225,093 | B2 | 7/2012 | Fok et al. |
| 8,375,360 | B2 | 2/2013 | I'Anson |
| 8,407,689 | B2 | 3/2013 | Doumov et al. |
| 8,429,630 | B2 | 4/2013 | Nickolov et al. |
| 8,572,706 | B2 | 10/2013 | Collison et al. |
| 9,071,522 | B2 | 6/2015 | Lucovsky et al. |
| 9,560,079 | B1 | 1/2017 | Lucovsky et al. |
| 2002/0178254 | A1 | 11/2002 | Brittenham et al. |
| 2003/0061247 | A1 | 3/2003 | Renaud |
| 2005/0198303 | A1 | 9/2005 | Knauerhase et al. |
| 2005/0289536 | A1 | 12/2005 | Nayak et al. |
| 2006/0037071 | A1* | 2/2006 | Rao .............. H04L 12/2856 726/13 |
| 2006/0079356 | A1 | 4/2006 | Kodama et al. |
| 2006/0136897 | A1 | 6/2006 | Laxminarayan et al. |
| 2007/0058548 | A1 | 3/2007 | Babonneau et al. |
| 2007/0209035 | A1 | 9/2007 | Sonderegger et al. |
| 2008/0163171 | A1 | 7/2008 | Chess et al. |
| 2008/0209016 | A1 | 8/2008 | Karve et al. |
| 2009/0070752 | A1 | 3/2009 | Alpern et al. |
| 2009/0070853 | A1 | 3/2009 | Chung et al. |
| 2009/0172781 | A1 | 7/2009 | Masuoka et al. |
| 2010/0103837 | A1* | 4/2010 | Jungck .............. H04L 29/12066 370/252 |
| 2010/0131590 | A1 | 5/2010 | Coleman et al. |
| 2010/0142447 | A1 | 6/2010 | Schlicht |
| 2010/0251328 | A1 | 9/2010 | Syed et al. |
| 2010/0257605 | A1 | 10/2010 | McLaughlin et al. |
| 2010/0281166 | A1 | 11/2010 | Buyya et al. |
| 2010/0318649 | A1 | 12/2010 | Moore et al. |
| 2011/0004916 | A1 | 1/2011 | Schiffman et al. |
| 2011/0055714 | A1 | 3/2011 | Vemulapalli et al. |
| 2011/0107411 | A1* | 5/2011 | McClain .............. H04L 63/102 726/9 |
| 2011/0126197 | A1 | 5/2011 | Larsen et al. |
| 2011/0145836 | A1 | 6/2011 | Wheeler et al. |
| 2011/0153727 | A1 | 6/2011 | Li |
| 2011/0153824 | A1 | 6/2011 | Chikando et al. |
| 2011/0167469 | A1 | 7/2011 | Letca et al. |
| 2011/0214124 | A1 | 9/2011 | Ferris et al. |
| 2011/0265168 | A1 | 10/2011 | Collison et al. |
| 2012/0102481 | A1 | 4/2012 | Mani et al. |
| 2014/0052867 | A1 | 2/2014 | Lucovsky et al. |

OTHER PUBLICATIONS

Partial European Search Report dated Jul. 1, 2011, Application No. 11163533.0, filing date Apr. 21, 2011 (Apr. 21, 2011), 6 pages.

Goodwill, James: "Java Web Applications", O'Reilly, Mar. 15, 2001 (Mar. 15, 2001), pp. 1-3, XP002646828, Retrieved from the Internet: URL: http://onjava.com/Ip1/a/671 [retrieved on Jun. 30, 2011].

Goodwill, James: "Deploying Web applications to Tomcat", O'Reilly, Apr. 19, 2001 (Apr. 19, 2001), pp. 1-11, XP002646829, Retrieved from the Internet: URL: http://oreilly.com/Ip1/a/780 [retrieved on Jun. 30, 2011].

Laurent Tanon: "Tomcat Architecture Diagram", Apr. 26, 2011 (Apr. 26, 2011), p. 1, XP002646830, Retrieved from the Internet: URL: http://marakana.com/forums/lomcal/general/106.hlml [retrieved on Jul. 1, 2011].

International Search Report and Written Opinion dated Jun. 14, 2012, Application No. PCT/US2012/033356, filing date Apr. 12, 2012 (Apr. 12, 2012), 14 pages.

Changua Sun et al.: "Simplifying Service Deployment with Virtual Appliances", Services Computing, 2008. sec '08 IEEE International Conference on, IEEE, Piscataway, NJ, USA, Jul. 7, 2008 (Jul. 7, 2008), pp. 265-272, XP031291269, ISBN: 978-0-7695-3283-7.

Leitner P, Application Level Performance Monitoring of Cloud Services Based on the Complex Event Processing Paradigm, Dec. 2012, vol. 9, pp. 1-8.

"The Eucalyptus Open-source Cloud-computing System," Nurmi et al; Cluster Computing and the Grid, 2009. CCGRID'09. 9$^{th}$ IEEE/ACM International Symposium, 2009, 8 pages.

* cited by examiner

POLICY ENGINE FOR CLOUD PLATFORM

CROSS-REFERENCE TO RELATED APPLICATIONS

The present application is a continuation of U.S. patent application Ser. No. 14/738,558, filed on Jun. 12, 2015, and entitled "Policy Engine for Cloud Platform," which is a continuation of U.S. patent application Ser. No. 14/064,992, filed on Oct. 28, 2013, and entitled "Policy Engine for Cloud Platform," which is a continuation of U.S. application Ser. No. 13/094,500, filed on Apr. 26, 2011, and entitled "Policy Engine for Cloud Platform," which claims the benefit of U.S. provisional patent application No. 61/327,898, filed on Apr. 26, 2010, and entitled "Policy Engine for Cloud Platform." The present application is further related by subject matter to U.S. patent application Ser. No. 12/767,010, filed on Apr. 26, 2010, and entitled "Cloud Platform Architecture," U.S. patent application Ser. No. 13/094,538, filed on Apr. 26, 2011, and entitled "Droplet Execution Engine for Dynamic Server Application Deployment," and U.S. patent application Ser. No. 13/094,521, filed on Apr. 26, 2011, and entitled "Rapid Updating of Cloud Applications," each of which is hereby incorporated by reference.

BACKGROUND

"Platform-as-a-Service" (also commonly referred to as "PaaS") generally describes a suite of technologies provided by a service provider as an integrated solution that enables a web developer (or any other application developer) to build, deploy and manage the life cycle of a web application (or any other type of networked application). One primary component of PaaS is a "cloud-computing platform" which is a network (e.g., Internet, etc.) infrastructure run and maintained by the service provider upon which developed web applications may be deployed. By providing the hardware resources and software layers required to robustly run a web application, the cloud computing platform enables developers to focus on the development of the web application, itself, and leave the logistics of scalability and other computing and storage resource requirements (e.g., data storage, database access, processing power, facilities, power and bandwidth, etc.) to the cloud computing platform (e.g., at a cost charged by the service provider). A service provider may additionally provide a plug-in component to a traditional IDE (i.e., integrated development environment) that assists a developer who creates web applications using the IDE to properly structure, develop and test such applications in a manner that is compatible with the service provider's cloud computing platform. Once the developer completes a web application using the IDE, the plug-in component assists the developer in deploying the web application into the cloud computing platform.

For example, a cloud computing platform that only supports Microsoft's .NET runtime environment would not be suitable for an enterprise with a technology development policy that requires development of web applications using an open source runtime environment such as the Apache Tomcat application server. Furthermore, software layers of current cloud computing platforms are inextricably coupled to the hardware resources (e.g., servers, storage, data centers, etc.) upon which they are built, making any enterprise requested customization, modification and/or portability of functionality prohibitive. Such inflexibility and limited choices make adoption of current PaaS more suitable for small start-up companies than for sophisticated enterprises that need to address issues such as governance, security, privacy and higher levels of control over web applications (service level requirements, scalability, fault tolerance etc.).

SUMMARY

To provide increased levels of control over web applications, one or more embodiments of the present invention provide a policy engine situated within the communications path between a cloud computing environment and a user of the cloud computing environment in order to comply with an organization's policies for deploying web applications in the cloud computing environment. One method, according to an embodiment, sets organizational policies for web applications deployed in a cloud computing environment, by performing the steps of intercepting a communications packet intended for the cloud computing environment, identifying a command relating to management of web applications in the communications packet, dispatching the communications packet to a rules engine corresponding to the identified command, executing a set of rules in the rules engine that implements a policy set by an organization desiring to deploy web applications in the cloud computing environment, and forwarding the communications packet to the cloud computing environment when completion of execution of the set of rules indicates compliance of the communications packet with the policy.

DETAILED DESCRIPTION

Figure 1:
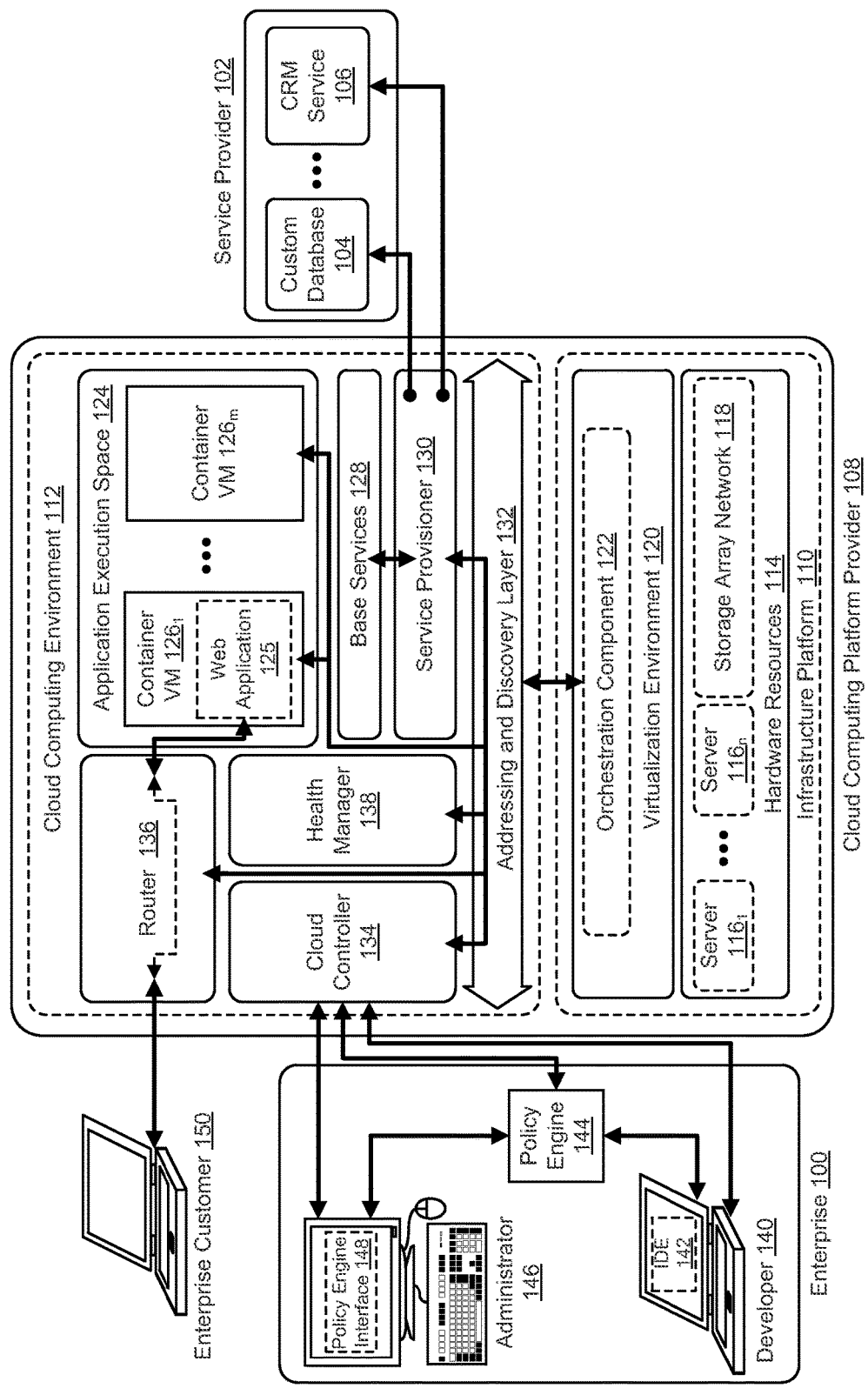
FIG. 1 depicts one embodiment of a cloud computing architecture for a service provider.

FIG. 1 depicts one embodiment of a cloud computing architecture for a service provider. An enterprise 100 desires to develop a web application to be deployed by service provider 102. For example, service provider 102 may have certain services (e.g., accessible, for example, via REST (Representational State Transfer) APIs (Application Programming Interface) or any other client-server communication protocol such as custom database 104 or CRM (Customer Relationship Management) service 106 (or any other service offered by service provider 102) that enterprise 100 desires to access through its developed web application. Service provider 102, in turn, utilizes resources provided by cloud computing platform provider 108 to provide a cloud computing environment in which enterprise 100 can deploy its web application.

Cloud computing platform provider 108 provides service provider 102 an infrastructure platform 110 upon which a cloud computing environment 112 may be executed. In the particular embodiment of FIG. 1, infrastructure platform 110 comprises hardware resources 114, such as servers $116_1$ to $116_n$ and one or more storage array networks (SAN), such as SAN 118, which are configured in a manner to provide a virtualization environment 120 that supports the execution of a plurality of virtual machines across servers $116_1$ to $116_n$. As further detailed below, these virtual machines provide the various services and functions that make up cloud computing environment 112.

Virtualization environment 120 of FIG. 1 additionally includes an orchestration component 122 (e.g., implemented as a process running in a virtual machine in one embodiment) that monitors the infrastructure resource consumption levels and requirements of cloud computing environment 112 (e.g., by monitoring communications routed through addressing and discovery layer 132 as further detailed below) and provides additional infrastructure resources to cloud computing environment as needed or desired. For example, if cloud computing environment 112 requires additional virtual machines to host newly deployed web applications or to scale currently running web applications to support peak demands, orchestration component 122 can initiate and manage the instantiation of virtual machines on servers $116_1$ to $116_n$ to support such needs. In one example implementation of an embodiment similar to that of FIG. 1, virtualization environment 120 may be implemented by running VMware ESX™ based hypervisor technologies on servers $116_1$ to $116_n$ provided by VMware, Inc. of Palo Alto, California (although it should be recognized that any other virtualization technologies, including Xen® and Microsoft Hyper-V virtualization technologies may be utilized consistent with the teachings herein).

In the embodiment of FIG. 1, cloud computing environment 112 supports an application execution space 124 that comprises a plurality of virtual machines (referred to as container VMs $126_1$ to $126_m$) instantiated to host deployed web applications. For example, the deployment by enterprise 100 of a web application 125 on the cloud computing platform of service provider 102 results in the hosting of web application 125 in container VM $126_1$ of application execution space 124 at cloud computing platform provider 108.

Figure 2:
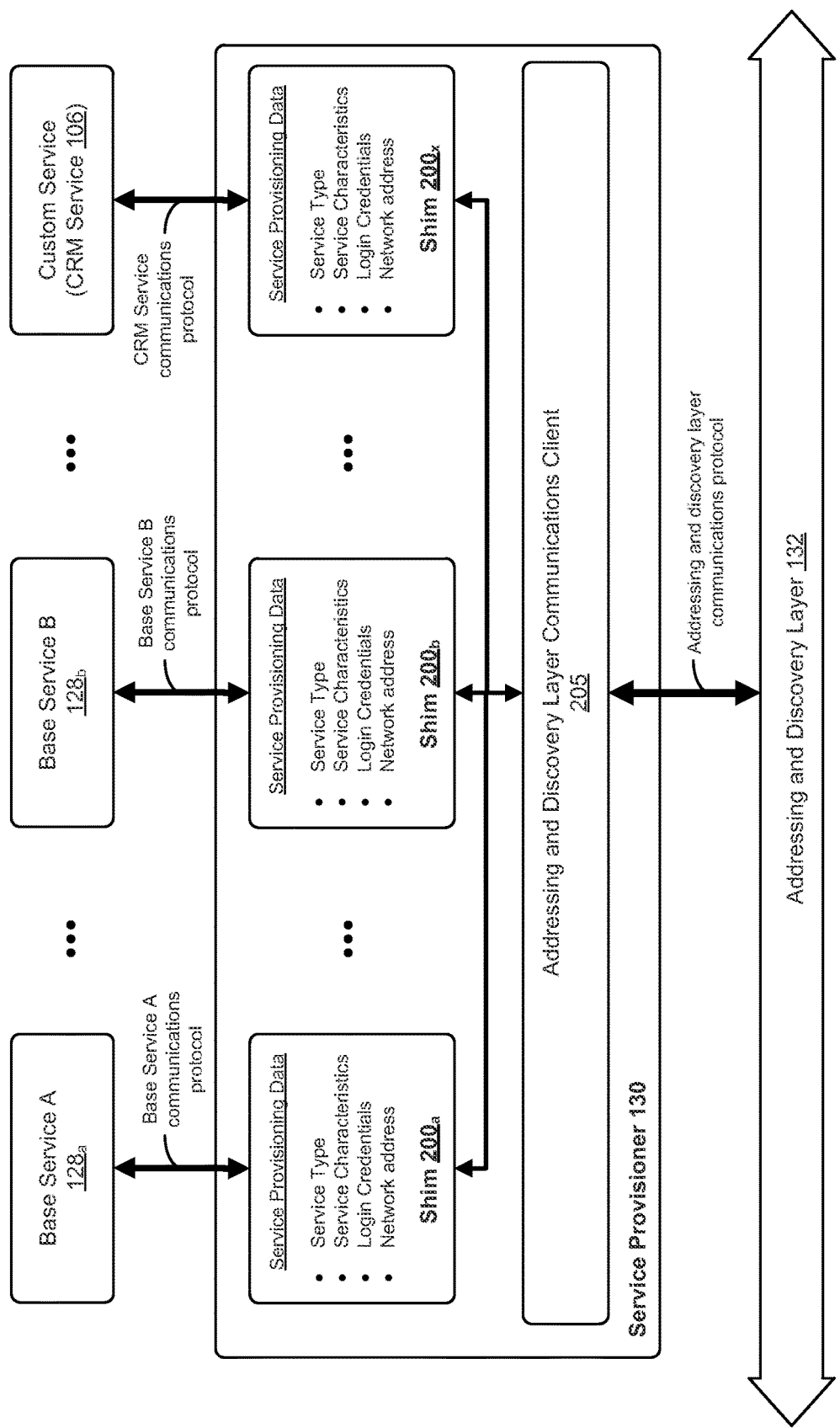
FIG. 2 depicts a component architecture for a service provisioner of a cloud computing environment.

Web application 125 can access a set of base services 128 (e.g., run in one or more virtual machines) provided by cloud computing environment 112 as well as third-party services such as those that may be provided directly by service provider 102 (e.g., custom database 104, CRM service 106, etc.). For example, a relational database service (e.g., MySQL, etc.), monitoring service, background task scheduler, logging service, messaging service, memory object caching service and the like may comprise base services 128 in one embodiment. A service provisioner 130 (e.g., run in one or more virtual machines) serves as a communications intermediary between these available services (e.g., base services 128 and other third party provided services such as custom database 104 and CRM service 106) and other components of cloud computing environment 112 (e.g., cloud controller 134, health manager 138, router 136, container VMs $126_1$ to $126_m$, etc.) and assists with the task of provisioning or binding such available services to web applications during the web application deployment process. FIG. 2 depicts a component architecture for service provisioner 130 of cloud computing environment 112, according to one embodiment. In the embodiment of FIG. 2, service provisioner 130 maintains a shim or similar stub component (sometimes referred to as a "service gateway") for each service available in cloud computing environment 112 (see, e.g., shims $200_a$, $200_b$ and $200_x$, respectively, for base services $128_a$ and $128_b$, and CRM service 106). Each shim component itself maintains service provisioning data for its corresponding service, such as a description of the service type, service characteristics (e.g., multi-tenancy versus single tenancy, etc.), login credentials for the service (e.g., root username, password, etc.), network address and port number of the service, and the like. Each shim component is configured to communicate with its corresponding service utilizing an API or other similar communications protocol that is supported by such service. For example, in order to bind web application 125 to base service $128_a$ during deployment, service provisioner 130 may direct shim $200_a$ to log into base service $128_a$ and generate new credentials (e.g., a new username and password) specifically for web application 125 so that web application 125 can directly log into and access base service $128_a$ with such credentials during its execution. In certain embodiments, service provisioner 130 further comprises an addressing and discovery layer communications client 205 that enables service provisioner 130 to communicate with other components of cloud computing environment 112 through addressing and discovery layer 132. In an alternative embodiment, service provisioner 130 may communicate with other components of cloud computing environment 112 through HTTP or other network protocols rather than through addressing and discovery layer 132, for example, to eliminate any compatibility requirements of third party services such as customer database 104 and CRM service 106 to utilize communication protocols of addressing and discovery layer 132.

It should be recognized that service provisioner 130 as depicted in FIG. 2 is only one embodiment of a communications intermediary between available services and other components of cloud computing environment 112 and that alternative embodiments may be implemented consistent with the teachings herein. For example, one alternative embodiment of service provisioner 130 may comprise independently operating shim components. In such an alternative embodiment, each shim component operates as an independent process and comprises its own addressing and discovery layer communications client to interact with addressing and discovery layer 132 (although, in alternative embodiments, such shim components may communicate with other components of cloud computing environment 112 through HTTP or other network protocols rather than utilizing such an address and discovery layer communications client 215). Such independent shim components may be implemented in different locations, so long as they are able to effectively communicate with address and discovery layer 132. For example, a shim for CRM service 106 may be implemented as a process running on a server at service provider 102 while shim components for base services $128_a$ and $128_b$ may be implemented as processes running within allocated virtual machines at cloud computing service provider 108.

Returning to FIG. 1, addressing and discovery layer 132 provides a common interface through which components of cloud computing environment 112, such as service provisioner 130, cloud controller 134, health manager 138, router 136 and container VMs $126_1$ to $126_n$ in application execution space 124, can communicate and receive notifications. For example, in one embodiment, service provisioner 130 may communicate through addressing and discovery layer 132 to broadcast the availability of services and to propagate service provisioning data for such services during deployment of web applications in cloud computing environment 112 (in other embodiments, service provisioner 130 may communicate with other components of cloud computing environment 112 through HTTP or other network protocols rather than address and discovery layer 132). Similarly, container VM $126_1$ may broadcast a notification through addressing and discovery layer 132 to indicate the successful deployment of web application 125 and to provide routing information (e.g., hostname and network address information, bound port number, etc.) for the successfully deployed web application 125. In one embodiment, addressing and discovery layer 132 is implemented as a message brokering service (e.g., running in one or more virtual machines) that defines a common protocol and message format through which components of cloud computing environment 112 can exchange messages and broadcast notifications and other information. In such an embodiment, the components of cloud computing environment 112 establish a connection with the message brokering service (e.g., also sometimes referred to as "subscribing" to the message brokering service), for example, through known authentication techniques (e.g., passwords, etc.) and, once connected to the message brokering service, can provide, receive and request messages, notifications and other similar information to and from other components that have also subscribed to the message brokering system. Examples of a message brokering service that may be used in an embodiment is RabbitMQ™ which is based upon the AMPQ (Advanced Message Queuing Protocol) open protocol standard or NATS, an open source publish-subscribe messaging system. It should be recognized, however, that alternative interfaces and communication schemes may be implemented for addressing and discovery layer 132 other than such a message brokering service.

Cloud controller 134 (e.g., run in one or more virtual machines) orchestrates the deployment process for web applications that are submitted to cloud computing environment 112 for deployment. Cloud controller 134 receives web applications submitted to cloud computing environment 112 and, as further detailed below, interacts with other components of cloud computing environment 112 to bind available services required by submitted web applications and package web applications for transmission to available container VMs (e.g., container VMs $126_1$ to $126_m$) for deployment. In the embodiment depicted in FIG. 1, web applications, such as web application 125, received by cloud controller 134 may be developed by an application developer 140 in enterprise 100 using an integrated development environment (IDE) 142 installed on the developer's laptop or terminal IDE 142 includes an installed plug-in provided by service provider 102 that facilitates the development and submission of web application 125 to cloud computing environment 112. In order to provide enterprise 100 the ability to impose enterprise-wide rules on web applications (e.g., permitted accessible services, computing resource consumption limitations, etc.), service provider 102 may also provide to enterprise 100 a policy engine 144 to be run, for example, as a proxy server within enterprise 100. As depicted in the embodiment of FIG. 1, policy engine 144 is situated in the communications path between the cloud controller 134 and entities that communicate with cloud computing environment 112 through cloud controller 134), such as application developer 140 or an administrator 146, as further discussed below. For example, policy engine 144 intercepts web applications submitted for deployment by developer 140 and reviews the requested requirements of such submitted web applications, prior to releasing them to cloud computing environment 112 for deployment. Administrator 146 in enterprise 100 is able to set policies for policy engine 144 as well as review analytics for web applications currently deployed in cloud computing environment 112 through a policy engine user interface 148 that communicates with policy engine 144 and can be accessed via a web browser or other client application. In one embodiment, policy engine 144 is further able to provide the same or similar functions as cloud controller 134 locally within enterprise 100. It should be recognized that policy engine 144 is an optional feature that may be provided by service provider 102 to enterprise 100 and that alternative embodiments or implementations may not utilize or include policy engine 144. For example, as depicted in FIG. 1, application developer 140 and administrator 146 may communicate directly with cloud controller 134, without utilizing policy engine 144. Furthermore, it should be recognized that in alternative embodiments, policy engine 144 may be situated at any location within the communications path to cloud controller 134, for example, within service provider 102 or cloud platform provider 108 rather than enterprise 100, as is depicted in FIG. 1. It should further be recognized that multiple policy engines 144, enforcing policies for different organizations, may be situated between in communications paths to cloud controller 134, for example, both within enterprise 100 and service provider 102. Cloud computing environment 134 further comprises a health manager 138 (e.g., run in one or more virtual machines) that tracks and maintains the "health" of cloud computing environment 112 by monitoring messages broadcast on addressing and discovery layer 132 by other components of cloud computing environment 112. For example, health manager 138 may notice the failure of an instance of a deployed web application and automatically broadcast a request to cloud controller 134 to re-start the web application. Similarly, health manager 138 may be further configured to itself initiate the re-starting of failed available services or other components of cloud computing environment 112 (e.g., cloud controller 134, service provisioner 130, router 136, etc.).

Once cloud controller 134 successfully orchestrates the deployment of web application 125 in container VM $126_1$, an enterprise customer 150 can access web application 125, for example, through a web browser or any other appropriate client application residing on a computer laptop or other computer terminal. Router 136 (e.g., run in one or more virtual machines) receives the web browser's access request (e.g., a uniform resource locator or URL) and routes the request to container VM $126_1$ which hosts web application 125. More generally, router 136 maintains mappings in internal routing tables between URLs and deployed web applications in order to properly route URL requests from customers to the appropriate container VMs hosting the requested web applications (as well as maintain load balancing among web application instances, etc.). These mappings are received by router 136 through address and discovery layer 132, as detailed further below, when a container VM successfully deploys a web application and thus broadcasts routing information (e.g., hostname, network address information, port number, etc.) for the web application through addressing and discovery layer 132.

It should be recognized that the embodiment of FIG. 1 is merely exemplary and that alternative cloud computing architectures may be implemented consistent with the teachings herein. For example, while FIG. 1 implements cloud computing environment 112 on an infrastructure platform 110 hosted by cloud computing platform provider 108, it should be recognized that cloud computing environment 112 may be implemented by entities other than cloud computing platform provider 108, on top of any type of hardware infrastructure. In one alternative embodiment, infrastructure platform 110 is provided by service provider 102 itself. Furthermore, unlike FIG. 1, in which infrastructure platform 110 comprises a virtualization environment 120 in which components of cloud computing environment 112 are implemented as processes or daemons running in one or more virtual machines, in alternative embodiments, the components of cloud computing environment 112 are run in a non-virtualized infrastructure platform 110, as processes or daemons directly on hardware resources 114. It should be recognized that embodiments may configure cloud computing environment 112 and infrastructure platform 110 in a loosely coupled manner with communication between computing environment 112 and infrastructure 110 only occurring through orchestration component 122 of infrastructure platform 110 which monitors hardware resource consumption by connecting to addressing and discovery layer 132). In such loosely coupled embodiments, it should be recognized that cloud computing environment 112 may be implemented on any infrastructure platform, including on a laptop or personal computer (e.g., in which case, each component of cloud computer environment 112 runs as a separate process or daemon on the laptop or personal computer).

Figure 3:
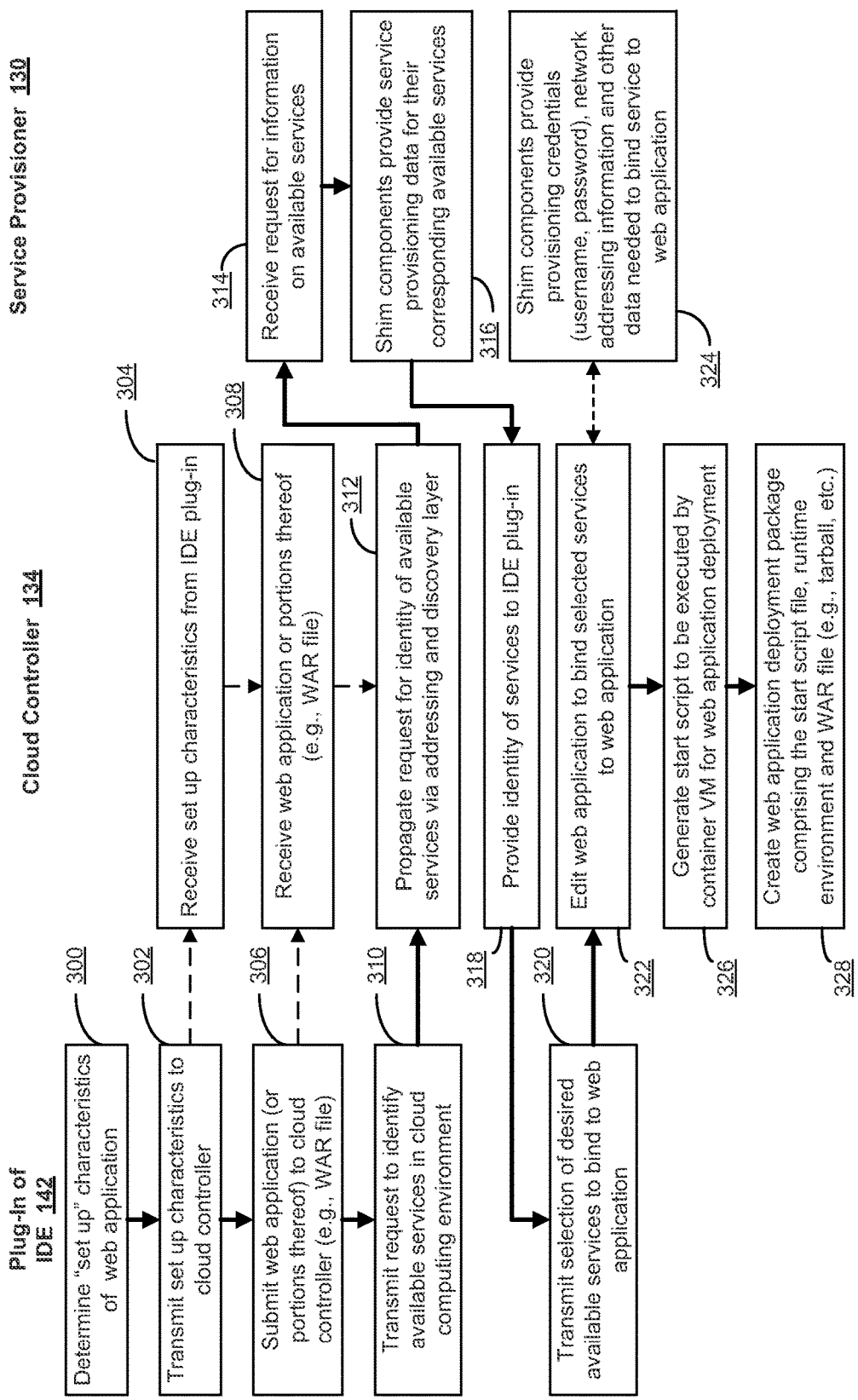
FIG. 3 depicts a flow diagram for preparing a web application for deployment by a cloud controller.

FIG. 3 depicts a flow diagram for preparing a web application for deployment by cloud controller 134. In step 300, the plug-in of IDE 142 analyzes the web application developed by developer 140 to determine "set-up" characteristics, such as the name of the web application and the application framework used to develop the web application (e.g., Spring, Ruby On Rails, etc.). For example, in one embodiment, the plug-in of IDE 142 determines the application framework used to develop the web application (e.g., Spring, Ruby on Rails, etc.) by analyzing the organizational structure of the various files (as well as possibly the contents of the files themselves) that make up the web application to identify characteristics that are specific to such application framework. In step 302, the IDE plug-in transmits the set-up characteristics to cloud controller 134 and cloud controller 134 receives such set-up characteristics in step 304. In step 306, the IDE plug-in 134 further submits the web application (or portions thereof) to cloud controller 134, which, in turn, receives the submitted web application in step 308. In one embodiment, the submitted web application takes the form of a Java web application archive or "WAR" file comprising dynamic (e.g., JavaServer Pages, etc.) web pages, static web pages, Java servlets, Java classes, and other property, configuration and resources files that make up a Java web application. It should recognized, however, that a web application may be submitted by IDE plug-in as any other type of package that is compatible with the runtime environment (e.g., Apache Tomcat application server, etc.) in which the web application is to be deployed. For example, in an alternative embodiment, the submitted web application comprise a plurality of files, similar to those in a WAR file, organized into a tape archive file or a "tar" file (also referred to as a tarball). Furthermore, it should be recognized that, rather than submitting the web application itself, alternative embodiments may submit web application in step 306 by providing a reference to download or otherwise access the web application, for example, by providing a uniform resource locator ("URL"), Git repository or other similar reference to web application. In such embodiments, the step of receiving the web application in step 308 would thus utilize the provided reference to fetch the web application. In step 310, the IDE plug-in then transmits a request to cloud controller 134 to identify the available services in cloud computing environment 112. For example, if the web application requires access to a database, the IDE plug-in may specifically request a list of database services (e.g., MySQL, Oracle, etc.) that are available in cloud computer environment 112. Upon receiving such request, in step 312, cloud controller 134 propagates its own request for service provisioning data relating to available services onto addressing and discovery layer 132. Upon receipt by service provisioner 130 of this request in step 314, the shim components of service provisioner 130 (see, e.g., FIGS. 2A and 2B) provide service provisioning data for their corresponding services via addressing and discovery layer 132 in step 316.

Upon receipt of such service provisioning data, in step 318, cloud controller 134 is then able to transmit the identity of available services to IDE 142 as requested in step 310. Upon receipt of the identity of available services, in step 320, the IDE plug-in then determines and transmits a selection of desired available services to bind to the submitted web application. It should be recognized that such a selection process may, in certain embodiments, be automated, in accordance with pre-configured preferences set in the IDE, or may involve manual selection by developer 140 in other embodiments. Upon receipt of the selection of services, in step 322, cloud controller 134 begins a "staging process" to stage, or otherwise modify the contents of the WAR file (or other package) of the submitted web application to bind the selected services to the web application. In one embodiment, this staging process involves unpacking the WAR file and extracting its constituent directory structure and files, accordingly inserting new files and/or modifying existing files to bind the selected services, and repacking the WAR file (e.g., or otherwise creating a new WAR file that replaces the previous WAR file). For example, in step 324, cloud controller 134 and the shim components of service provisioner 130 for the selected services may exchange messages through addressing and discovery layer 132 to establish or otherwise obtain additional service provisioning data such as service login credentials (e.g., username/password combinations), hostname, network address and port number to access the service and any requisite software drivers/libraries that may be needed to enable the submitted web application to communicate with the services upon deployment. Cloud controller 134 is then able to incorporate such service provisioning data into the contents of the WAR file as part of the staging process. In one embodiment, set-up information identifying the application framework utilized to develop the submitted web application (i.e., that was received by cloud controller 134 in step 300) enables cloud controller 134 to properly insert service provisioning data into the contents of the WAR file to bind selected services based upon a data organization structure of the WAR file that is imposed by the application framework (e.g., inserting additional environmental variables, entries in configuration files, additional system parameters and the like reflecting, for example, the hostname, network address, port number and login credentials for the service, etc.). For example, if the application framework is the Spring framework, cloud controller 134 inserts service provisioning data into the contents of the WAR file in accordance with how a Spring framework developed web application organizes its data within the WAR file. Once the contents of the WAR file have been modified to bind selected services to the submitted web application, in step 326, cloud controller 134 generates a start script file that can be executed by a container VM to start a runtime environment and launch the submitted web application in the runtime environment. For example, if the WAR file is intended to be deployed in a runtime environment such as Apache Tomcat application server, the start script file may include commands to start Apache Tomcat and then start the servlet (or servlets) that comprises web application 125 (e.g., via a net start command, etc.). In an alternative embodiment, such staging as described in steps 322-324 may be deferred until the submitted web application is actually deployed, as further described below (when describing FIG. 5).

In step 328, cloud controller 134 then creates a web application deployment package that can be unpacked by any available container VM. In one embodiment, such a web application deployment package is a "tar" file (also referred to as a tarball) that includes the start script file, an instance of the runtime environment (e.g., Apache Tomcat, etc.) to be installed and started in a container VM, and the WAR file for web application 125 (e.g., embedded in an appropriate directory within the directory structure of the instance of the runtime environment). Alternative embodiments may include further optimizations to streamline the communication (and utilized network bandwidth) between the IDE plug-in at enterprise 100 and cloud controller 134. For example, in one embodiment, in step 302, IDE plug-in may include as part of the transmission of set-up characteristics, a "fingerprint" list of hash values (e.g., SHA-1 values, etc.) and file sizes for each file in the WAR file. Cloud controller 134, in turn, maintains its own table of fingerprint entries for hash value/file size pairs, with each entry associated with a stored file. Upon receipt of the list from the IDE plug-in, cloud controller 134 determines whether it already has any of the files in the WAR file by reviewing its table. In such manner, cloud controller 134 can specifically request only those files with associated hash values and file sizes for which cloud controller 134 does not have an entry in its table. Such an optimization can significantly reduce the amount of data transmitted by IDE plug-in to cloud controller 134. For example, if only a few lines of code have been changed in a single library file of an already uploaded web application, the foregoing fingerprinting process enables the IDE plug-in to transmit only the library file itself, rather than the entire WAR file. Similarly, since different web applications often share common application framework files, the foregoing fingerprinting process can further significantly reduce the uploading times for different web applications. It should be recognized that although an IDE (or IDE plug-in) is described in FIG. 3, alternative embodiments may initiate the flow in FIG. 3 performed by the IDE plug-in using other non-IDE environments. For example, developer 140 may interact with cloud controller 134 through a command line interface ("CLI"), other applications, or any other similar process or tool capable of initiating a network request (e.g., HTTP request) to communicate with cloud controller 134. Furthermore, it should be recognized that embodiments may include a policy engine 144 that intercepts communication between IDE plug-in (or CLI or other similar tool) and cloud controller 134, altering communications in order to adhere to set policies and/or performing steps on behalf of the IDE plug-in (e.g., selecting services in step 320 according to pre-defined policies, etc). It should also be recognized that functionalities described herein as provided in a plug-in IDE (or CLI or other application or tool) may be alternatively provided inside the cloud computing environment 112, for example, in cloud controller 134, in alternative embodiments. For example, in one alternative embodiment, determination of the application framework as part of the "set-up" characteristics in step 300 may be performed by cloud controller 134 upon its receipt of the web application.

Figure 4A:
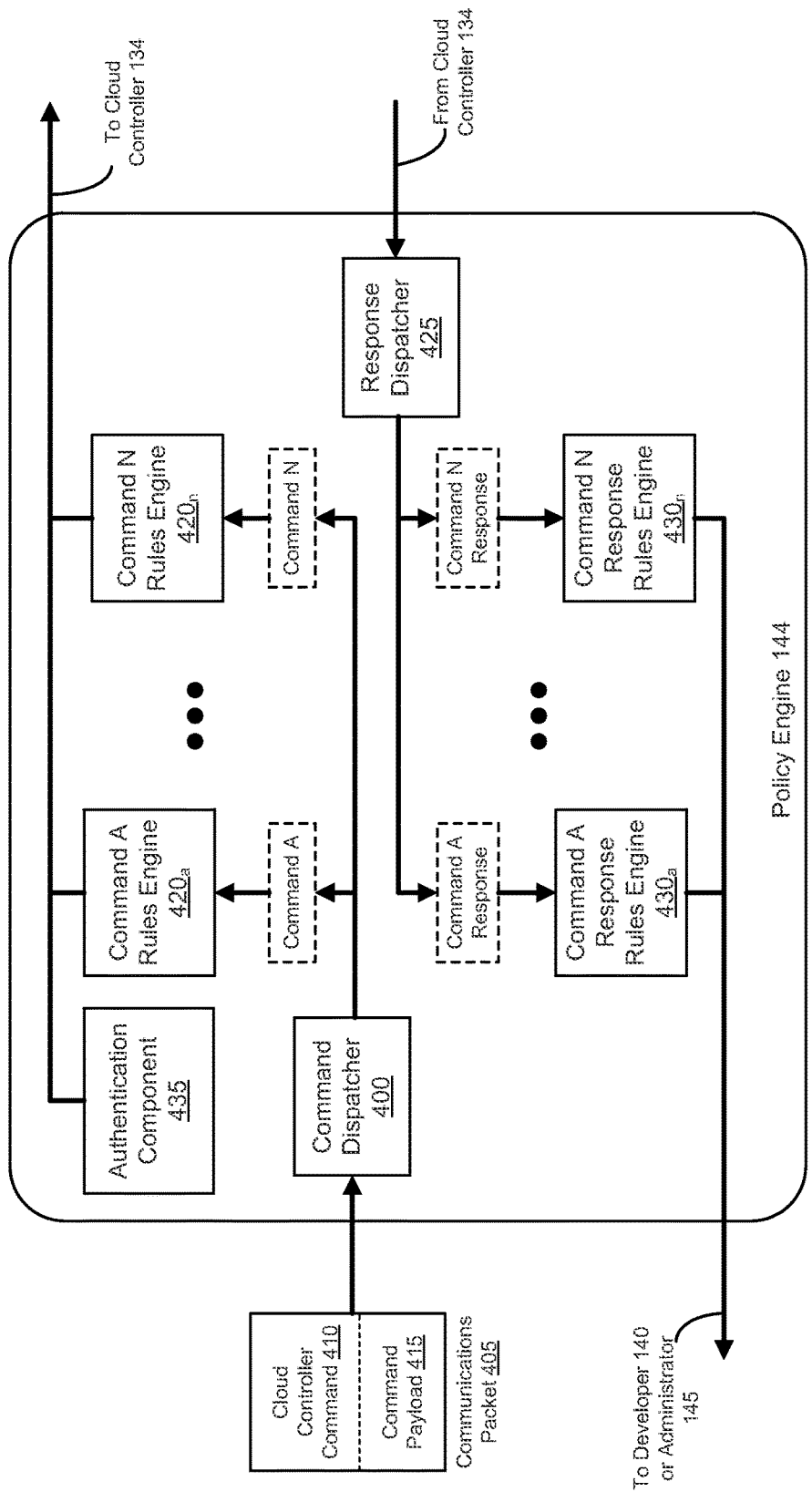
FIG. 4A depicts a component architecture for a policy engine communicating with a cloud controller.

As discussed in the context of FIG. 1, in one embodiment, policy engine 144 is situated within enterprise 100 to intercept communications between cloud controller 134 and users of cloud computing environment 112 (e.g., developer 140, administrator 146, etc.) and filters such communications prior to transmission to cloud controller 134. FIG. 4A depicts a component architecture of a policy engine communicating with a cloud controller. As previously discussed, policy engine 144 may be implemented as a process in a proxy server that is transparent to users who may perceive that they are corresponding directly with cloud controller 134. In the embodiment of FIG. 4A, each discrete communications packet 405 received by policy engine 144 comprises a cloud controller command 410 and command payload data 415. The set of cloud controller commands understood by cloud controller 134, for example, may be defined by a REST API using HTTP or any other client-server communications protocol. Such cloud controller commands may relate to registering an account, logging into an account, providing set-up characteristics for a web application to cloud controller 134, pushing a web application to cloud controller 134, starting a pushed web application, stopping a running web application and other commands. Upon receipt of communications packet 405, a command dispatcher 400 of policy engine 144 identifies the type of cloud controller command 410 and directs the communications packet to an appropriate command rules engine component corresponding to cloud controller command 410 (see rules engines $420_a$ to $420_n$). Each such rules engine $420_a$ to $420_n$ can initiate execution of rules related to its corresponding command in order to comply with policies imposed by organization running policy engine 144, such as enterprise 100. The execution of rules in rule engines $420_a$ to $420_n$ to impose set policies may, for example, appropriately edit the command payload data 415 in communications packet 405 (e.g., revise the proposed name of a web application in a URL according to enterprise application naming policies, etc.), access a networked service (e.g., access an IT ticket issuing system to determine whether a ticket has been created to stop a web application upon receipt of a cloud controller command to stop the web application, etc.), or redirect the user to interact with another service prior to satisfying the cloud controller command (e.g., request developer 140 to login to the local system of enterprise 100 to provide appropriate authentication credentials, etc.). Once a rules engine $420_a$ to $420_n$ has completed execution, it can permit communications packet 405 to proceed to cloud controller 134 or reject communications packet 405 for non-compliance with the organization's policies. In similar fashion, policy engine 144 may receive responses from cloud controller 134 at a response dispatcher 425, which dispatches the received responses to command response rules engines $430_a$ to $430_n$ that relate to the commands generating the received responses from cloud controller 134.

Embodiments of policy engine 144 may further include an authentication component 435 to authenticate users accessing cloud computing environment 112. In one embodiment, each user at enterprise 100 that utilizes cloud computing environment 112 has a corresponding federated identity or token that is maintained by authentication component 435. Once a user authenticates and logs into policy engine 144 or otherwise logs into the organization's local authentication system, authentication component 435 determines the user's corresponding federated identity or token. In one embodiment, this federated identity or token is then included in communications packets forwarded by policy engine 144 to cloud controller 134 or is otherwise provided to cloud controller 134 in association with such communications packets. Enterprise 100 may choose to associate a federated identity or token with multiple users. For example, all web developers may be associated with one federated identity or token and a different federated identity or token may be associated with all program managers. Alternatively, enterprise 100 may choose allocate a different federated identity or token to each different user.

Figure 4B:
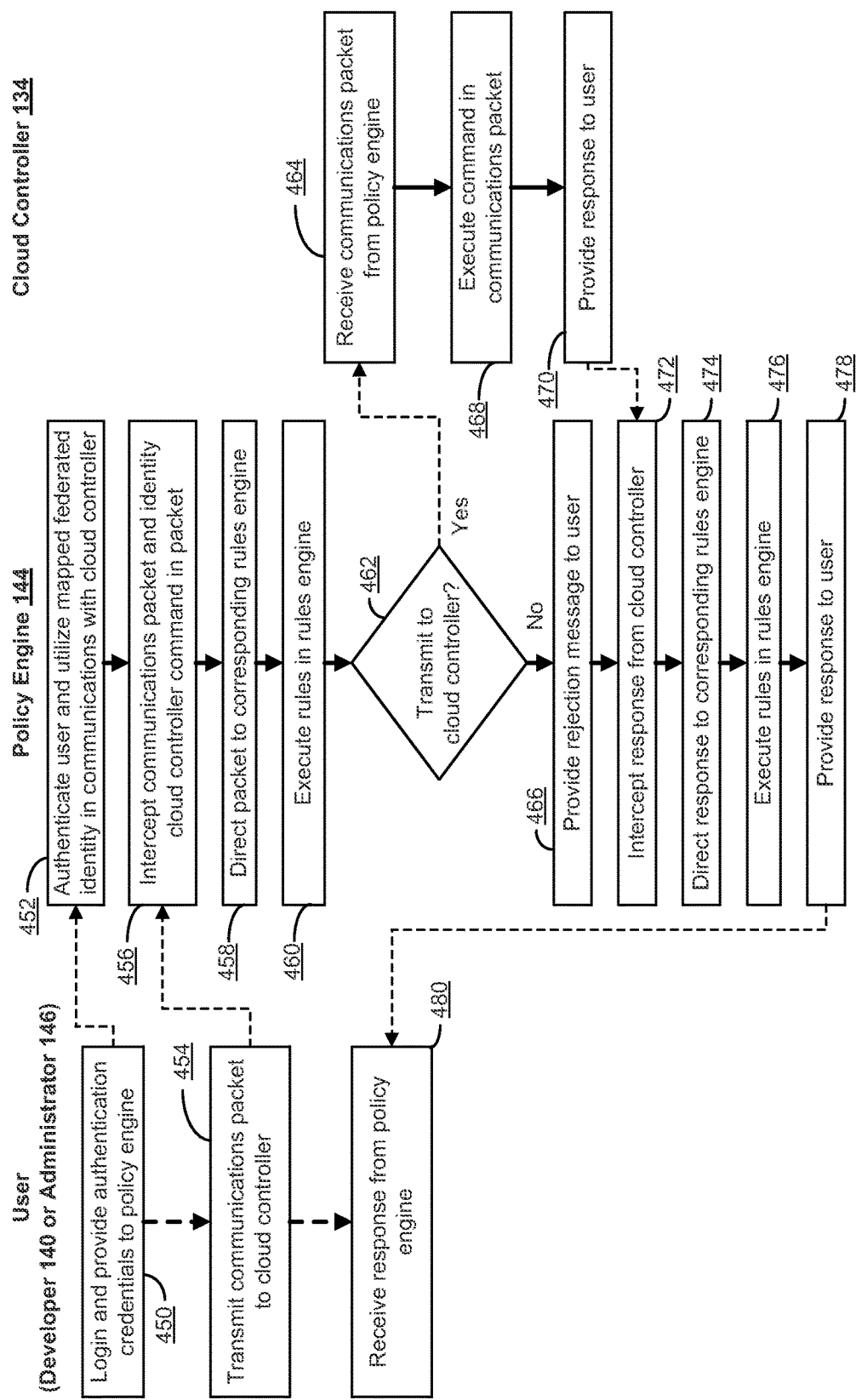
FIG. 4B depicts a flow diagram of a policy engine for an organization implementing policy rules for use of a cloud computing environment.

FIG. 4B depicts a flow diagram of a policy engine for an organization implementing policy rules for use of a cloud computing environment. In step 450, a user at the organization, such as developer 140 or administrator 146, logs into policy engine 144 by providing authentication credentials (e.g., locally within the user's organization). In step 452, policy engine 144 receives the authentication credentials and utilizes a federated identity that is mapped to the authenticated user when communicating with cloud controller 134 on behalf of the user. In step 454, the user transmits a communications packet 405 to cloud controller 134. Such a communications packet 405 may relate to providing set-up characteristics of a web application, pushing the web application to the cloud computing environment, starting the web application, stopping the web application and other similar commands. In step 456, policy engine 144 intercepts the communications packet and identifies cloud controller command 410 in communications packet 405. In step 458, policy engine 144 directs the communications packet to one of rule engines $420_a$ to $420_n$ that corresponds to cloud controller command 410. In step 460, the rules engine executes a set of rules in order to comply with the organization's policies. If, in step 462, execution of the set of rules indicates or otherwise results in compliance of communications packet 405 with the organization's policies, then in step 464, cloud controller 134 receives communications packet 405. Otherwise, in step 466, policy engine 144 notifies the user of rejection of the communications packet. In step 468, cloud controller 134 executes the command and in step 470, sends a response back to the user. In step 472, policy engine 144 intercepts the response to the user and in step 474, if necessary, directs the response to a corresponding command response rules engine $430_a$ to $430_n$. In step 476, the corresponding command response rules engine executes a set of rules to comply with the organization's set policies and in step 478, policy engine 144 provides the response to the user, who receives it in step 480.

Figure 5:
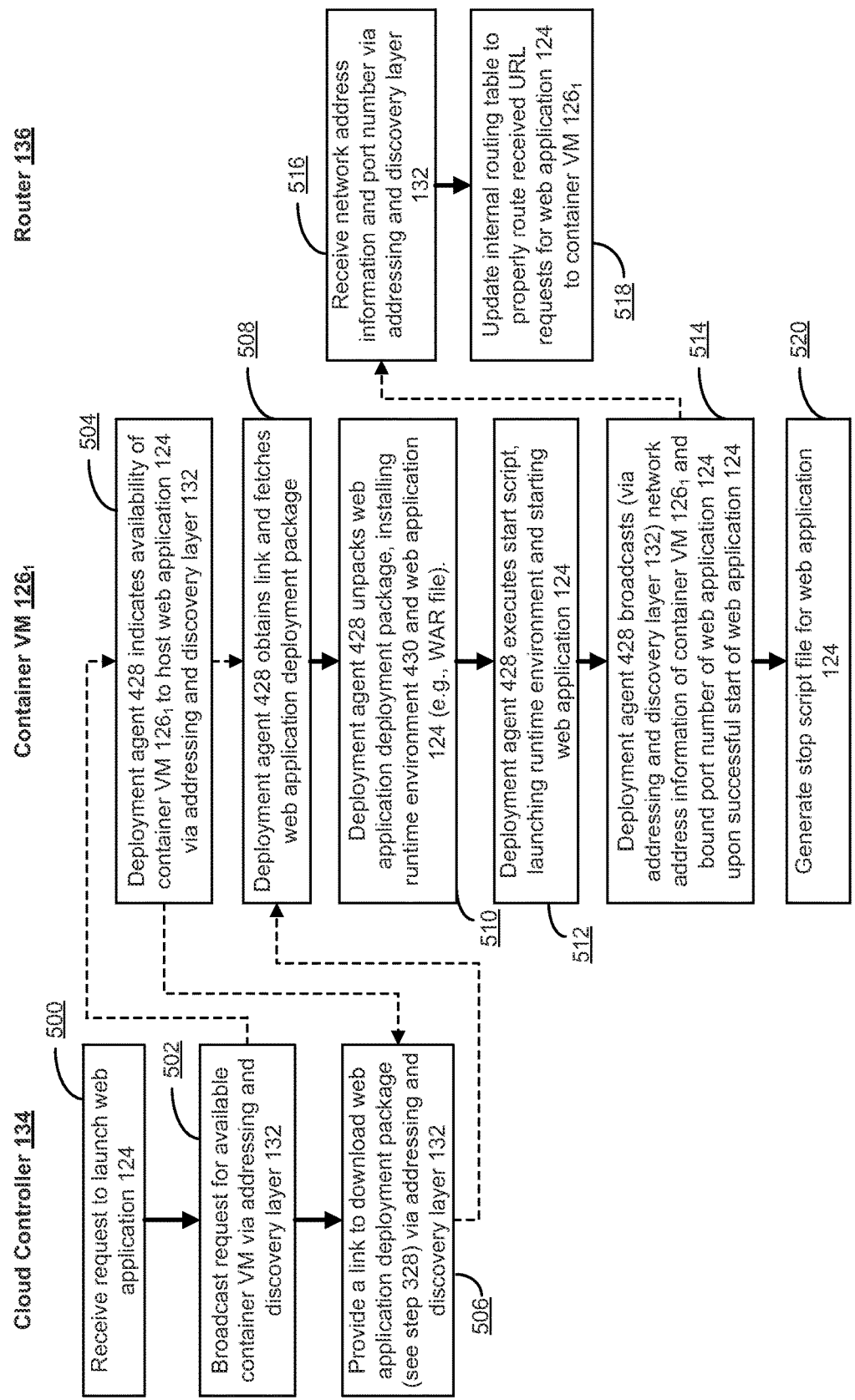
FIG. 5 depicts a flow diagram for deploying a web application in a container virtual machine.

FIG. 5 depicts a flow diagram for deploying a web application in a container virtual machine. The steps set forth in FIG. 5 take place, for example, after cloud controller 134 has received and prepared web application 125 for deployment in accordance with the steps set forth in FIG. 3. In step 500, cloud controller 134 receives a request from enterprise 100 (e.g., from developer 140) to launch web application 125. In step 502, cloud controller 134 broadcasts a request (via addressing and discovery layer 132) for an available container VM. In one embodiment, such a broadcast request may "flavored" by cloud controller 134 to request specific characteristics desired in a container VM, such as guest operating system type (e.g., Windows, Linux, MacOS, etc.), computing resource requirements (e.g., memory requirements, etc.) and the like. In step 504, deployment agent 428 of container VM $126_1$ responds (via addressing and discovery layer 132) indicating the availability of container VM $126_1$ to host web application 125. In step 506, cloud controller 134 (via addressing and discovery layer 132) provides deployment agent 428 a link (e.g., URL) or otherwise establishes a connection with container VM $126_1$ to download a web application deployment package for web application 125 (e.g., as created in step 328 of FIG. 3), and in step 508, deployment agent 428 fetches or otherwise receives the web application deployment package. In step 510, deployment agent 428 unpacks the web application deployment package and installs runtime environment 430 (e.g., Apache Tomcat application server, etc), including loading the WAR file (or other package) associated web application 125 into the appropriate directory of the runtime environment. In step 512, deployment agent 428 executes the start script file of the web application deployment package thereby spawning a new process in container VM $126_1$ that launches the runtime environment (e.g., Apache Tomcat) and starts web application 125 within the runtime environment.

In certain embodiments, base services 128 and/or third party services (such as custom database 104 and CRM service 106) are dynamically bound to web application 125 upon its launch in step 512 rather than during steps 322-324 of the staging process as previously described in the context of FIG. 3. In one such embodiment, cloud controller 134 may maintain globally accessible environment variables for available services in cloud computing environment 112. For any particular service, the values of such environment variables may provide service provisioning data such as the hostname, network address and port number or login credentials for the service. In one embodiment, such environment variables are initialized by cloud controller 134 during the staging process, for example, after step 320 of FIG. 3, when a service has been identified to cloud controller 134 to be used by web application 125 during its deployment. In such an embodiment, the staged web application 125 itself includes code (i.e., the web programmer knows to programmatically check the values of such environment variables or such code is otherwise injected into web application 125 during the staging process) that the searches for the names of environment variables for services that are utilized by web application 125 and binds web application 125 to those services using the values of such environment variables. As such, launch of web application 125 in step 512 causes such code in web application 125 to be executed, thereby dynamically binding the services to web application 125 upon its launch by utilizing the service provisioning data values of the environment variables.

Once deployment agent 428 recognizes that web application 125 has successfully launched (e.g., by confirming the successful binding of a port number to web application 125 in one embodiment), deployment agent 428 broadcasts the hostname, network address information of container VM $126_1$ and the bound port number of deployed web application 125, in step 514, through addressing and discovery layer 132. In turn, router 136 retrieves the broadcast hostname, network address information and bound port number though the addressing and discovery layer 132 in step 516 and updates its internal routing table in step 518, thereby enabling router 136 to properly route URL requests received from enterprise customer 144 for web application 125 to container VM $126_1$. It should be recognized that the process of dynamically updating routing information in router 136 upon successful deployment of a web application through steps 514 to 518 provides cloud computing environment 112 flexibility to more easily migrate, move or otherwise re-deploy web applications to different containers VM $126_1$ to $126_m$, for any of a number of reasons (e.g., during hardware failures, for load balancing purposes, etc.). For example, in one exemplary scenario, health manager 138 may recognize that web application 125 has stopped running because server $116_1$ that hosts container VM $126_1$ in which web application 125 has been deployed has suffered a hardware failure. Upon such recognition, health manager 138 may initiate a request to cloud controller 134 to re-deploy web application 125 in a different container VM running on a different server. Once web application 125 has been successfully re-deployed by cloud controller 134, as a result of steps 514 to 518, router 136 will be automatically updated with new routing information to properly route requests to web application 125 which is now deployed on a different container VM on a different server (and therefore is associated with new network routing information). It should be recognized that although the foregoing description utilizes hostnames, network addresses and port numbers to generally describe network address information for a web application, any type of network information may be utilized as network address information in embodiments, depending upon the structure of the connected network and communications protocols implemented by cloud computing environment 112. Additionally, in step 520, deployment agent 428 also identifies a process identifier for the deployed web application 125 and generates a stop script file, in the event that cloud controller 134 receives a command to stop web application 125 in the future (e.g., by request of administrator 146, etc.).

It should be recognized that various modifications and changes may be made to the specific embodiments described herein without departing from the broader spirit and scope of the invention as set forth in the appended claims. For example, while the foregoing description has discussed embodiments using web applications or Internet applications, it should be recognized that any network utilizing application can leverage the techniques disclosed herein, and as such, "web application" as used herein shall be interpreted to include any type of client-server based application that employs network based communications. Furthermore, although the foregoing embodiments have focused on the use of container VMs to host deployed web applications, it should be recognized that any "application container" may be used to host web applications, including such container VMs, processes in virtual machines, kernel level containers, processes in traditional non-virtualized operating systems and any other execution environment that provides an isolated environment capable of running application level code. Similarly, while the various components of cloud computing environment 112 have been generally described as being implemented in one or more virtual machines (e.g., for load balancing and scalability purposes), it should be recognized that any type of "application container" (as previously discussed above) can also implement such components, including, for example, traditional non-virtualized computing environment background processes, threads or daemons. Furthermore, any combination of different types of "application containers" to host web applications and implement other components (e.g., cloud controller 134, router 136, health manager 138, base services 128, service provisioner 130, addressing and discovery layer 132, etc.) can comprise any particular cloud computing environment 112 implementation. It should further be recognized that multiple instances of the various components of cloud computing environment 112 (e.g., cloud controller 134, router 136, health monitor 138, service provisioner 130, etc.) may be implemented in alternative embodiments, for example, for scalability purposes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:
1. A method comprising:
   intercepting, by a response dispatcher of a policy engine running on one or more computers of a cloud computing environment, a response to a command, the response being sent by a cloud controller device of the cloud computing environment to a user device that issued the command;

dispatching, by the response dispatcher, the response to a response rules engine corresponding to the command;

executing, by the response rules engine, a set of one or more rules representing a response policy on how to deploy a web application in the cloud computing environment; and forwarding the response to the user device in response to determining that a result of execution of the set of one or more rules by the response rules engine indicates compliance of the response with the response policy.

2. The method of claim 1, wherein the policy engine comprises a plurality of response rules engines, each of the response rules engines correspond to a respective command.

3. The method of claim 1, wherein the command is a command for creating or managing a deployment of the web application in the cloud computing environment through the cloud controller device.

4. The method of claim 3, wherein command relates to providing configuration information for the web application to a cloud controller in the cloud computing environment, deploying another web application in the cloud computing environment, starting a web application deployed in the cloud computing environment, or stopping a web application executing in the cloud computing environment.

5. The method of claim 1, wherein each rule of the rules specifies at least one of a permitted accessible service of the web application or a computing resource consumption limitation on the web application.

6. A system comprising:
one or more computers; and
one or more storage devices storing instructions that are operable, when executed by the one or more computers, to cause the one or more computers to perform operations comprising:
    intercepting, by a response dispatcher of a policy engine running on the one or more computers of a cloud computing environment, a response to a command, the response being sent by a cloud controller device of the cloud computing environment to a user device that issued the command;
    dispatching, by the response dispatcher, the response to a response rules engine corresponding to the command;
    executing, by the response rules engine, a set of one or more rules representing a response policy on how to deploy a web application in the cloud computing environment; and
    forwarding the response to the user device in response to determining that a result of execution of the set of one or more rules by the response rules engine indicates compliance of the response with the response policy.

7. The system of claim 6, wherein the policy engine comprises a plurality of response rules engines, each of the response rules engines correspond to a respective command.

8. The system of claim 6, wherein the command is a command for creating or managing a deployment of the web application in the cloud computing environment through the cloud controller device.

9. The system of claim 8, wherein command relates to providing configuration information for the web application to a cloud controller in the cloud computing environment, deploying another web application in the cloud computing environment, starting a web application deployed in the cloud computing environment, or stopping a web application executing in the cloud computing environment.

10. The system of claim 6, wherein each rule of the rules specifies at least one of a permitted accessible service of the web application or a computing resource consumption limitation on the web application.

11. A non-transitory computer storage device storing instructions that, when executed by one or more computers, cause the one or more computers to perform operations comprising:
    intercepting, by a response dispatcher of a policy engine running on the one or more computers of a cloud computing environment, a response to a command, the response being sent by a cloud controller device of the cloud computing environment to a user device that issued the command;
    dispatching, by the response dispatcher, the response to a response rules engine corresponding to the command;
    executing, by the response rules engine, a set of one or more rules representing a response policy on how to deploy a web application in the cloud computing environment; and
    forwarding the response to the user device in response to determining that a result of execution of the set of one or more rules by the response rules engine indicates compliance of the response with the response policy.

12. The non-transitory computer storage device of claim 11, wherein the policy engine comprises a plurality of response rules engines, each of the response rules engines correspond to a respective command.

13. The non-transitory computer storage device of claim 11, wherein the command is a command for creating or managing a deployment of the web application in the cloud computing environment through the cloud controller device.

14. The non-transitory computer storage device of claim 13, wherein command relates to providing configuration information for the web application to a cloud controller in the cloud computing environment, deploying another web application in the cloud computing environment, starting a web application deployed in the cloud computing environment, or stopping a web application executing in the cloud computing environment.

15. The non-transitory computer storage device of claim 11, wherein each rule of the rules specifies at least one of a permitted accessible service of the web application or a computing resource consumption limitation on the web application.

* * * * *